United States Patent
Coehoorn et al.

(10) Patent No.: US 6,271,998 B1
(45) Date of Patent: Aug. 7, 2001

(54) THIN FILM SHIELDED MAGNETIC READ HEAD DEVICE

(75) Inventors: Reinder Coehoorn, Eindhoven (NL); Jacques C. S. Kools, San Jose, CA (US); Derk J. Adelerhof, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/379,958

(22) Filed: Aug. 24, 1999

(30) Foreign Application Priority Data

Aug. 25, 1998 (EP) .................................................. 98202839

(51) Int. Cl.$^7$ ..................................................... G11B 5/39
(52) U.S. Cl. .......................................................... 360/324.2
(58) Field of Search ............................. 360/324.2, 324.1, 360/324.12, 324, 325, 314

(56) References Cited

U.S. PATENT DOCUMENTS

| | | | |
|---|---|---|---|
| 5,251,088 | * 10/1993 | Coutellier et al. | 360/324.2 |
| 5,311,385 | * 5/1994 | Schwarz et al. | 360/319 |
| 5,463,516 | * 10/1995 | Valet et al. | 360/254.3 |
| 5,474,833 | * 12/1995 | Etienne et al. | 428/209 |
| 5,712,612 | * 1/1998 | Lee et al. | 338/32 R |
| 5,726,837 | * 3/1998 | Nakatani et al. | 360/324.2 |
| 5,729,410 | * 3/1998 | Fontana, Jr. et al. | 360/324.2 |
| 5,986,858 | * 11/1999 | Sato et al. | 360/324.2 |
| 6,023,395 | * 2/2000 | Dill et al. | 360/324.2 |

FOREIGN PATENT DOCUMENTS

0791916A2   8/1997  (EP) .
WO 9837550 * 8/1998  (WO) .

* cited by examiner

Primary Examiner—David L. Ometz
Assistant Examiner—Franklin D. Altman
(74) Attorney, Agent, or Firm—Laurie E. Gathman

(57) ABSTRACT

A thin film shielded magnetic read head device comprises an end face extending in a first direction, in which a magnetic information carrier is movable with respect to the magnetic head device, and in a second direction, perpendicular to said first direction. The magnetic head device further comprises shield forming flux guiding elements for magnetic cooperation with the information carrier, which elements extend in the second direction and in a third direction, perpendicular to the first and the second direction. A number of magnetoresistive elements each having a spin tunnel junction structure is provided, which number of magnetoresistive elements corresponds to with the number of magnetic channels of the magnetic head device. One of said shields forms a common contact lead for the current through said magnetoresistive elements. Thin film magnetic read head device is applied in a system for reading information from a magnetic information carrier.

11 Claims, 2 Drawing Sheets

THIN FILM SHIELDED MAGNETIC READ HEAD DEVICE

BACKGROUND OF THE INVENTION

The present invention relates to a thin film shielded magnetic read head device, comprising an end face extending in a first direction, in which a magnetic information carrier is movable with respect to the magnetic head device, and in a second direction, perpendicular to said first direction, the magnetic head device further comprising shield forming flux guiding elements for magnetic cooperation with the information carrier, which elements extend in the second direction and in a third direction, perpendicular to the first and the second direction, and form a flux path in the first and the third direction, and a magnetoresistive element with a spin tunnel junction structure, one of said shields forming a common contact lead for the current through said magnetoresistive element.

Such a shielded magnetic read head device is known from EP-A-0 791 916. In the head device described in said document both shields are used as a contact lead for the current through the magnetoresistive element. Therefore, the known construction is limited to a single channel head device.

SUMMARY OF THE INVENTION

The object of the invention is to provide a shielded magnetic read head device, the construction of which is applicable in both single and multi-channel read head devices.

This object is achieved by the shielded magnetic read head device according to the invention, which is characterized by a number of magnetoresistive elements with a spin tunnel junction structure forming parallel flux paths in the first and the third direction, the number of magnetoresistive elements corresponding to the number of magnetic channels of the magnetic head device.

As in this construction only one of the shields can be used as a contact lead, the head device is further characterized in that a spin tunnel junction structure and the shields are separated from each other by at least metallic nonmagnetic layers, one of which forms a contact to one of the shields, while the other metallic nonmagnetic layer forms a further contact lead and is separated from the neighbouring shield by an insulating layer.

In a shielded read head construction, several embodiments of a spin tunnel junction structure are possible. However, in a more general structure each spin tunnel junction structure will comprise a first (F1) and a second (F2) metallic layer, each of said layers having at least one ferromagnetic layer, the first and second metallic layer being separated from each other by a barrier layer consisting of Al—O, Al—N, Hf—O or suchlike oxides or nitrides.

In the following a magnetoresistive element with a spin tunnel junction structure will be indicated as a STJ-MR element. The areal dimension of a STJ-MR element is determined by the joint area of the first and the second metallic layer (F1 and F2).

These two metallic layers (F1 and F2) may be patterned such that they have the same dimension in the second direction. Their maximum width is then determined by the track pitch.

In accordance with a first alternative, the second metallic layer is patterned to a smaller dimension in the second direction than the first metallic layer by applying an etching process that stops at or in the barrier layer. This makes it possible to independently optimize the magnetic and micromagnetic response of the first and the second metallic layer. For example, the first metallic layer can be patterned after a picture frame, whereas the smaller second metallic layer can be used to selectively sense which part of the first metallic layer yields the optimum between a large on-track response and a small off-track response. In the case of a multichannel head, the first metallic layer may form e.g. a single picture frame structure or a single long stripe structure, whereas the second metallic layer structures are present at distances equal to N x track pitch, i.e. the distance between tracks read out simultaneously (N=1, 2, etc.).

In accordance with a second alternative, the joint area between the first and second metallic layer is selected by locally thinning the metal forming the insulating barrier before oxidation or nitridation or by thinning the insulating barrier after oxidation or nitridation. Technically, this may be possible with the help of a focused ion beam (FIB) apparatus in the etch mode, used in situ during preparation of the junction in a UHV deposition apparatus. Use is made of the exponential dependence of the tunnelling resistance on the barrier thickness.

It has already been mentioned that a more general structure of the spin tunnel junctions, as specified above in a shielded read head construction enables several specific embodiments of a spin tunnel junction structure to be achieved.

In a first embodiment, the first metallic layer (F1) is soft magnetic, the magnetization thereof in the quiescent state being in the second direction, and the second metallic layer (F2) is provided with a ferromagnetic film whose magnetization direction is pinned in the third direction by contact with an antiferromagnet, a hard magnetic ferromagnet or ferrimagnet or an artificial antiferromagnet.

In a second embodiment, the first and second metallic layers (F1 and F2) are both soft magnetic, the magnetizations in said layers in the quiescent state crossing each other as a result of a stray field from an exchanged biased soft magnetic film or a thin film permanent magnet, present close to the spin tunnel junction structure further away from the end face of the magnetic head device.

In a third embodiment, the first and second metallic layers (F1 and F2) are ferromagnetic having a different magnetic easy direction structure and a magnetization whose vectors rotate in opposite directions when a magnetic flux is offered to the read head device.

In a fourth embodiment, the first metallic layer (F1) has a multilayer structure consisting of two soft magnetic layers, separated by a metallic nonmagnetic layer, the magnetization of these soft magnetic layers in the quiescent state being antiparallel in the second direction, while the second metallic layer (F2) comprises a ferromagnetic film whose magnetization direction is pinned in the third direction by contact with an antiferromagnet, a hard magnetic ferromagnet or ferrimagnet or an artificial antiferromagnet.

The invention not only relates to a thin film shielded magnetic read head device as indicated above, but also to a system for reading information from a magnetic information carrier comprising such a thin film shielded magnetic read head device.

BRIEF DESCRIPTION OF THE DRAWINGS

In the following description, with reference to the drawings, a more general structure of a shielded magnetic read head device and some specific embodiments of spin tunnel junctions applied therein will be given, by way of non-limitative example.

DESCRIPTION OF THE PREFERRED EMBODIMENTS

Figure 1:
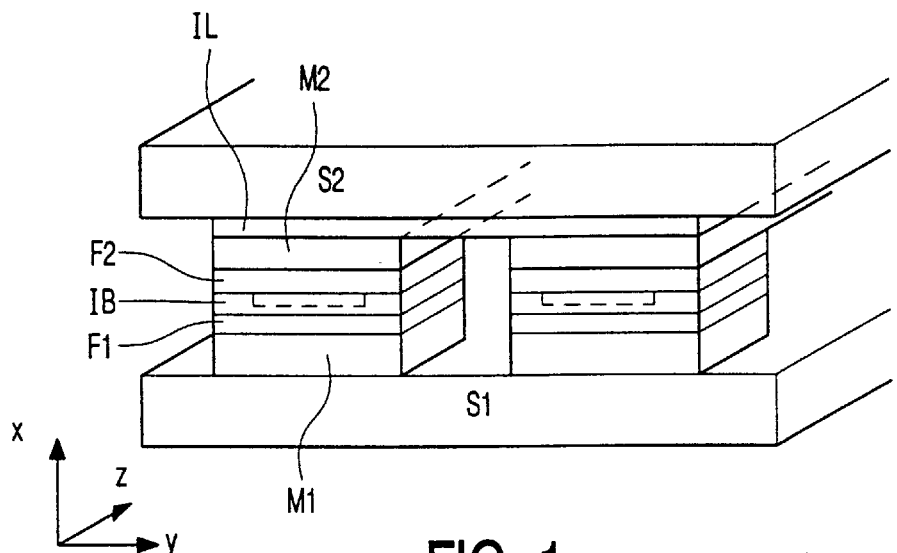
FIG. 1 schematically shows a general structure of a shielded magnetic read head device according to the invention.

FIG. 1 shows the end face of a thin film shielded magnetic read head device. This end face extends in a first direction x in which a magnetic information carrier, e.g. a tape or a disc, is movable with respect to the magnetic head device, and in a second direction y, perpendicular to said first direction. The magnetic head device further comprises shield-forming flux guiding elements S1 and S2, hereinafter indicated as shields, for magnetic cooperation with the information carrier. These shields extend in the second direction y and in a third direction z, perpendicular to the first and the second direction. A number of magnetoresistive elements with a spin tunnel junction structure, so-called STJ-MR elements, is provided; in FIG. 2 only two of these STJ-MR elements are indicated. The STJ-MR elements and the shields S1 and S2 together form a number of parallel flux paths in the x and the z direction; this number corresponds to the number of magnetic channels of the magnetic head device. The STJ-MR elements have the general structure F1/IB/F2, F1 and F2 being metallic layers, which each have at least one ferromagnetic layer, and IB being an insulating barrier layer situated between these metallic layers F1 and F2. The barrier layer IB may be of Al—O, Al—N, Hf—O or suchlike oxides or nitrides or it may be any other suitable insulating layer. Apart from the at least one ferromagnetic layer, the layers F1 and F2 may contain other layers of a metallic, ferromagnetic, ferrimagnetic, antiferromagnetic or non-magnetic material, which form a laminated structure with said ferromagnetic layer(s). By means of such a laminated structure, the magnetization curve of the ferromagnetic layers, the coupling between the layers across the barrier, their micromagnetic stability and the tunnelling resistance and magnetoresistance may be optimized.

The metallic layer F1 is separated from the shield S1 by a metallic nonmagnetic layer M1. The shield S1 forms a first contact lead for the current through the STJ-MR element. Between the metallic layer F2 and the shield S2, a metallic nonmagnetic layer M2 is provided, said layer M2 being separated from the shield S2 by a further insulating layer IL. The layer M2 of each STJ-MR element forms a second contact lead for the current through the respective STJ-MR element. The thickness of the layers M1 and M2 can be chosen so as to optimize the sensitivity and micromagnetic stability of the head. FIG. 1 is only schematic; e.g. in actual designs the position of one of the Layers F1 or F2 may be recessed with respect to the head medium interface, whereas the other layer is almost in contact with the interface. The shape of the elements is not necessarily almost square; it may be strongly elongated, e.g. in the z-direction, and even nonrectangular shapes may be of interest in some cases.

As already stated hereinabove, the areal dimension of a STJ-MR is determined by the joint area of the metallic layers F1 and F2. In the foregoing, three possibilities for obtaining a joint area of these layers F1 and F2 are indicated. Although in FIG. 1 the metallic layers F1 and F2 have the same dimension (the first possibility), the second alternative is indicated in interrupted lines, viz. a smaller joint area of the layers F1 and F2 by locally thinning the insulating barrier layer by means of an etching process.

Figure 2:
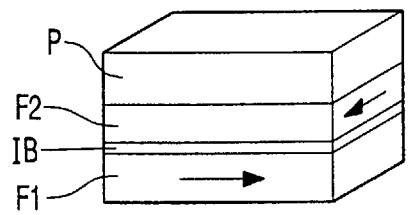
FIGS. 2–5 show four embodiments of a spin tunnel junction structure applied therein.

In the embodiment of FIG. 2, the layer F1 is made of a soft magnetic material, e.g. permalloy, while the layer F2 consists of a ferromagnetic film, e.g. permalloy, Co, Fe, etc., whose magnetization direction is pinned in a direction perpendicular to the head medium interface by the contact with an antiferromagnet, a hard magnetic ferromagnet or a so-called artificial antiferromagnet layer P. If in the quiescent state the magnetization in layer F1 is directed parallel to the head end face, i.e. perpendicular to the magnetization of layer F2, the response to flux from a magnetic information carrier results in a linear variation of the resistance with minimal hysteresis.

Figure 3:
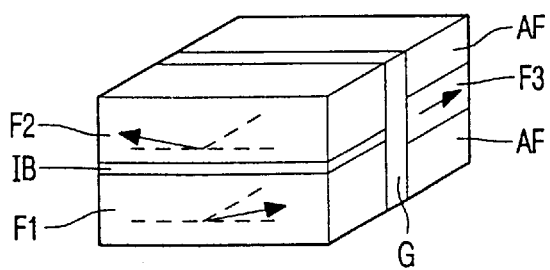

In the embodiment of FIG. 3, both layers F1 and F2 are soft magnetic. Both layers are patterned in the form of a rectangular structure. As a result of magnetostatic coupling between the two layers, their magnetization directions tend to be antiparallel in the quiescent state, due to induced magnetocrystalline anisotropy, parallel to the head-medium interface. However, biasing, via a nonmagnetic insulating gap layer G or an air gap, by the stray field from a soft magnetic film F3, exchange biased by an antiferromagnetic layer AF, or from a thin film permanent magnet, present close to the STJ at a position further away from the head medium interface, leads to a quiescent state in which the magnetizations are essentially crossed. This results in a highly linear response and a good cross-track profile. This structure could be improved by making use of an element with 'field straddling easy axis directions'.

Figure 4A:
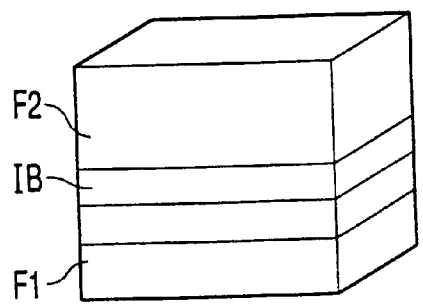
Figure 4B:
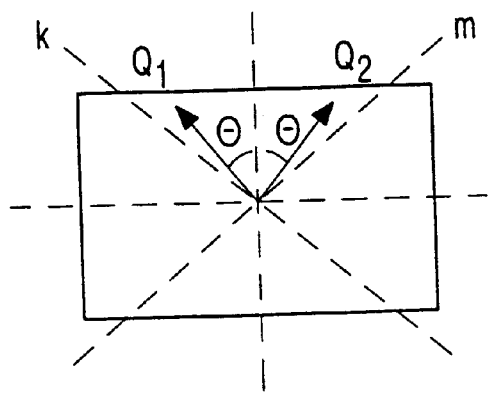

An embodiment with field straddling easy axis directions is illustrated in FIGS. 4A and 4B. During the growth of each one of the ferromagnetic layers F1 and F2, a magnetic field is applied that defines the direction of a magnetic easy axis. The direction of the applied field during the growth of the layer F1 is different from the direction of the field during the growth of the layer F2. In the schematic planview of FIG. 4B, the easy axis of the layer F1 is indicated by k and the easy axis of the layer F2 by m. The ferromagnetic layers F1 and F2 are magnetized in such a way that a magnetization with vector Q1 results in the layer F1 and a magnetization vector Q2 of the layer F2. When during operation a magnetic flux is offered to the layer structure, the magnetization vectors rotate, the rotation depending on the strength of the magnetocrystalline anisotropy of the layers F1 and F2, the exchange coupling between the two layers across the barrier layer IB and the magnetostatic coupling between the layers F1 and F2. A further explanation of a structure with field straddling easy axis directions is given in WO-A-96/07926; however, the structure described therein does not relate to STJ-MR elements.

Figure 5:
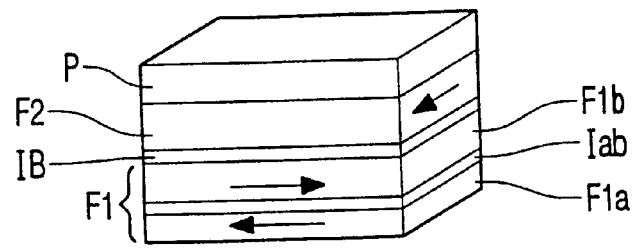

The embodiment of FIG. 5 illustrates a combination of the structures of the first and the second embodiment; the simplicity from the point of view of fabrication of the structure in the first embodiment is combined with the advantage of a good cross-track profile of the structure in the second embodiment. The layer F1 is a sandwich layer of two identical soft magnetic layers F1a and F1b with their easy axis parallel to the head-medium interface. In the quiescent state, the magnetization directions are antiparallel each along the easy direction, due to magnetostatic interaction via the intermediate layer Iab. The magnetization of the layer F2 is pinned in the direction perpendicular to the head medium interface. As mentioned with respect to the first embodiment, this pinning is again realized by means of an antiferromagnet, a hard magnetic ferromagnet or an artificial antiferromagnet P. The resistance is mainly or entirely determined by the angle of magnetization of the upper soft magnetic layer F1b with respect to that of the pinned layer F2.

As compared with multichannel AMR (anisotropic magnetoresistive) and CIP-GMR (current-in-plane giant magnetoresistive) based shielded heads, the use of STJ structures in the proposed head structures has a number of advantages:

The STJ structure is much simpler, resulting in a reduction of the number of fabrication steps and the application of one of the shields as a contact lead for the current through all the STJ-MR elements;

A very small read gap length is made possible, thus making recording at significantly shorter wavelengths feasible. This advantage is of increasing importance as a result of the rapid growth of the areal bit density. The read gap length of a shielded head formed as shown in FIG. 1, but using AMR or CIP-GMR elements, is determined by the total thickness of AMR or CIP-GMR films, contact leads and two insulating oxide layers. For such systems, it is very difficult to reduce the read gap length to a value below about 100–200 nm, which is determined predominantly by the thickness of the two oxide layers that are required to insulate the MR element from the shields. In contrast, the total thickness of the STJ may be as small as about 15 to 25 nm. Only one insulating oxide layer is required. The thickness of the nonmagnetic metallic layers M1 and M2 is a free parameter from the point of view of the proper functioning of the STJ. A reduction of the read gap length to values significantly smaller than 100 nm will be feasible.

The signal voltage is independent of the track width. As a result of the perpendicular geometry of the element, the current density is determined only by the voltage across the element, not by its lateral dimensions. Therefore, also the signal voltage (for a given current density) is independent of the lateral dimensions. In contrast, for AMR and CIP-GMR elements the signal voltage decreases linearly with decreasing track width.

The invention is not limited to the described embodiments but relates, within the scope of the following claims, to all types of thin film shielded magnetic read head devices as well as to reading devices including such a head device; the head device may be used for very high density hard disc reading systems as well for advanced tape readings systems.

What is claimed is:

1. Thin film shielded magnetic read head device, comprising an end face extending in a first direction in which a magnetic information carrier is movable with respect to the magnetic head device, and in a second direction, perpendicular to said first direction, the magnetic head device further comprising:

shield forming flux guiding elements for magnetic cooperation with the information carrier, said shield forming flux guiding elements extending in the second direction and in a third direction, perpendicular to the first and the second direction, and forming a flux path in the first and the third direction, and a magnetoresistive element with a spin tunnel junction structure, one of said shield forming flux guiding elements forming a contact lead for the current through said magnetoresistive element, characterized by a number of magnetoresistive elements with a spin tunnel junction structure forming parallel flux paths in the first and the third direction, the number of magnetoresistive elements corresponding to the number of magnetic channels of the magnetic head device.

2. Thin film shielded magnetic read head device according to claim 1, characterized in that a spin tunnel junction structure and said shield forming flux guiding elements are separated from each other by at least metallic nonmagnetic layers, one of which forms a contact to one of said shield forming flux guiding elements, while the other metallic nonmagnetic layer forms a further contact lead and is separated from the neighbouring shield forming flux guiding element by an insulating layer.

3. Thin film shielded magnetic read head device according to claim 1, characterized in that each spin tunnel junction structure comprises a first (F1) and a second (F2) metallic layer, each of said layers comprising at least one ferromagnetic layer, the first and the second metallic layer being separated from each other by an insulating barrier layer consisting of Al—O, Al—N, or Hf—O.

4. Thin film shielded magnetic read head device according to claim 3, characterized in that the metallic layers (F1 and F2) have the same dimension in the second direction.

5. Thin film shielded magnetic read head device according to claim 3, characterized in that, by applying an etching process that stops at the barrier layer, one of the metallic layers (F2) has a dimension in the second direction which is smaller than that of the other metallic layer (F1).

6. Thin film shielded magnetic read head device according to claim 3, characterized in that the joint area between the magnetic layers (F1 and F2) is obtained by locally thinning the metal forming the insulating barrier layer before oxidation or nitridation or by locally thinning this layer after oxidation or nitridation.

7. Thin film shielded magnetic read head device according to claim 3, wherein the first metallic layer (F1) is soft magnetic, the magnetization thereof in the quiescent state being in the second direction, and said at least one ferromagnetic layer of which the second metallic layer (F2) is comprised has a magnetization direction pinned in the third direction by contact with an antiferromagnet, a hard magnetic ferromagnet or ferrimagnet or an artificial antiferromagnet.

8. Thin film shielded magnetic read head device according to claim 3, wherein the first and the second metallic layer (F1 and F2) are both soft magnetic, the magnetizations in said layers in the quiescent state crossing each other due to a stray field from an exchanged biased soft magnetic film or a thin film permanent magnet, present close to the spin tunnel junction structure further away from the end face of the magnetic head device.

9. Thin film shielded magnetic read head device according to any one of the claims 3–6, characterized in that the first and the second metallic layer (F1 and F2) are ferromagnetic with a different magnetic easy direction structure and a magnetization whose vectors rotate in opposite directions when a magnetic flux is offered to the read head device.

10. Thin film shielded magnetic read head device according to claim 3, wherein the first metallic layer (F1) has a multilayer structure consisting of two soft magnetic layers, separated by a metallic nonmagnetic layer, the magnetization of said soft magnetic layers in the quiescent state being antiparallel in the second direction, and in that the second metallic layer (F2) comprises a ferromagnetic film whose magnetization direction is pinned in the third direction by contact with an antiferromagnet, a hard magnetic ferromagnet or ferrimagnet or an artificial antiferromagnet.

11. System for reading information from a magnetic information carrier, comprising a thin film magnetic read head device according to claim 1.

* * * * *